United States Patent [19]
Gilson

[11] 4,406,579
[45] Sep. 27, 1983

[54] AIRFLOW CONVERTER

[76] Inventor: James Gilson, Rte. 6, Box 236 Tennessee Dr., Seymour, Tenn. 37865

[21] Appl. No.: 262,041

[22] Filed: May 11, 1981

[51] Int. Cl.³ .............................................. F03D 3/04
[52] U.S. Cl. .................... 415/2 R; 415/90; 415/DIG. 8
[58] Field of Search ............... 415/2–4 R, 415/2–4 A, DIG. 8, 90; 416/4, 60 R, 60 A

[56] References Cited

U.S. PATENT DOCUMENTS

| | | | |
|---|---|---|---|
| 129,567 | 7/1872 | Jones | 415/4 A |
| 401,516 | 4/1889 | Robb | 415/DIG. 8 X |
| 1,434,916 | 11/1922 | Seymour | 415/DIG. 8 |
| 1,471,095 | 10/1923 | Bonetto | 415/2 R |
| 1,496,767 | 6/1924 | Bonetto | 415/4 X |
| 1,744,924 | 1/1930 | Sargent | 416/4 |
| 2,078,837 | 4/1937 | Carter | 416/4 X |
| 2,616,506 | 11/1952 | Mathias | 415/2 A |
| 3,048,006 | 8/1962 | Goodman | 415/DIG. 8 X |
| 3,187,191 | 6/1965 | Baggs | 290/52 |
| 3,436,908 | 4/1969 | Van Delic | 60/26 |
| 3,720,840 | 3/1973 | Gregg | 415/2 A X |
| 3,970,409 | 7/1976 | Luchuk | 416/60 A X |
| 4,079,264 | 3/1978 | Cohen | 290/55 |
| 4,118,636 | 10/1978 | Christian | 290/52 |
| 4,122,675 | 10/1978 | Polyak | 60/398 |
| 4,224,528 | 9/1980 | Argo | 290/55 |
| 4,275,309 | 6/1981 | Lucier | 290/55 X |
| 4,275,309 | 6/1981 | Lucier | 415/2 A X |
| 4,309,146 | 1/1982 | Hein | 415/2 R |

FOREIGN PATENT DOCUMENTS

| | | | |
|---|---|---|---|
| 142137 | 6/1935 | Austria | 415/DIG. 8 |
| 936949 | 12/1955 | Fed. Rep. of Germany | 416/111 |
| 2402647 | 7/1975 | Fed. Rep. of Germany | 415/2 A |
| 2815764 | 10/1979 | Fed. Rep. of Germany | 415/2 A |
| 2941222 | 4/1981 | Fed. Rep. of Germany | 415/3 A |
| 589603 | 6/1925 | France | 416/60 A |
| 1086320 | 2/1955 | France | 415/2 A |
| 2374533 | 8/1978 | France | 415/DIG. 8 |
| 253560 | 7/1927 | Italy | 416/4 |
| 20794 | of 1906 | United Kingdom | 415/DIG. 8 |

Primary Examiner—Everette A. Powell, Jr.
Attorney, Agent, or Firm—Luedeka & Neely

[57] ABSTRACT

An apparatus for converting solar and wind energy into rotational energy comprises a housing defining a lower aperture, an upper aperture and a plenum extending between the apertures. A wheel carrying a plurality of cylindrical foils is mounted within the housing for rotation about a horizontal axis. As the wheel rotates, the foils are sequentially located between the apertures. An elongated tube extends upwardly from the upper aperture to develop airflow through the plenum.

7 Claims, 2 Drawing Figures

AIRFLOW CONVERTER

The present invention relates to an apparatus for converting wind and thermal energy into rotational energy.

With the ever-rising costs of fossil fuels, it has become increasingly important to consider alternative sources for producing electrical energy. Windmills are one type of apparatus for converting a naturally occurring form of energy, wind, into rotational energy, which may in turn be used to develop electricity. Another naturally occuring form of energy which has been considered for conversion heretofore is that of the convection currents of air heated by sunlight. For example, as disclosed in U.S. Pat. Nos. 401,516 and 3,436,908, black, vertical tubes have been used to absorb sunlight and heat air so that it travels upwardly through the tube. The upwardly moving air is directed through a vaned wheel, having a generally vertical rotational axis, to effect rotation of the turbine in a horizontal plane. The rotational energy of the wheel is then used to drive an electric generator, for example.

These prior convection energy converters have been quite dependent upon the degree of sun exposure. That is, while the airflow through a plain vertical tube is reasonable on bright, sunny days, the airflow through the tubes is exceedingly low when the sky is overcast. Also, the efficiency of the vaned wheels has not been sufficient to justify the large scale use of the convection tubes with vaned wheels.

It has been recognized that small increases in the amount of airflow past a windmill produce substantial increases in the power output of the mill. More specifically, an increase of about ten percent in wind speed can produce an increase of about thirty percent in power output. It will be recognized therefore that even marginal improvements in the airflow through a converter can be extremely beneficial in terms of power output.

It is therefore an object of the present invention to provide an improved convection energy converter. It is also an object to provide a convection energy converter which uses prevailing winds to increase air flow within the converter. It is a further object to provide an improved wheel for a convection energy converter.

Various other objects and advantages of the present invention will be apparent when the following description is considered along with the accompanying drawings in which.

Figure 1:
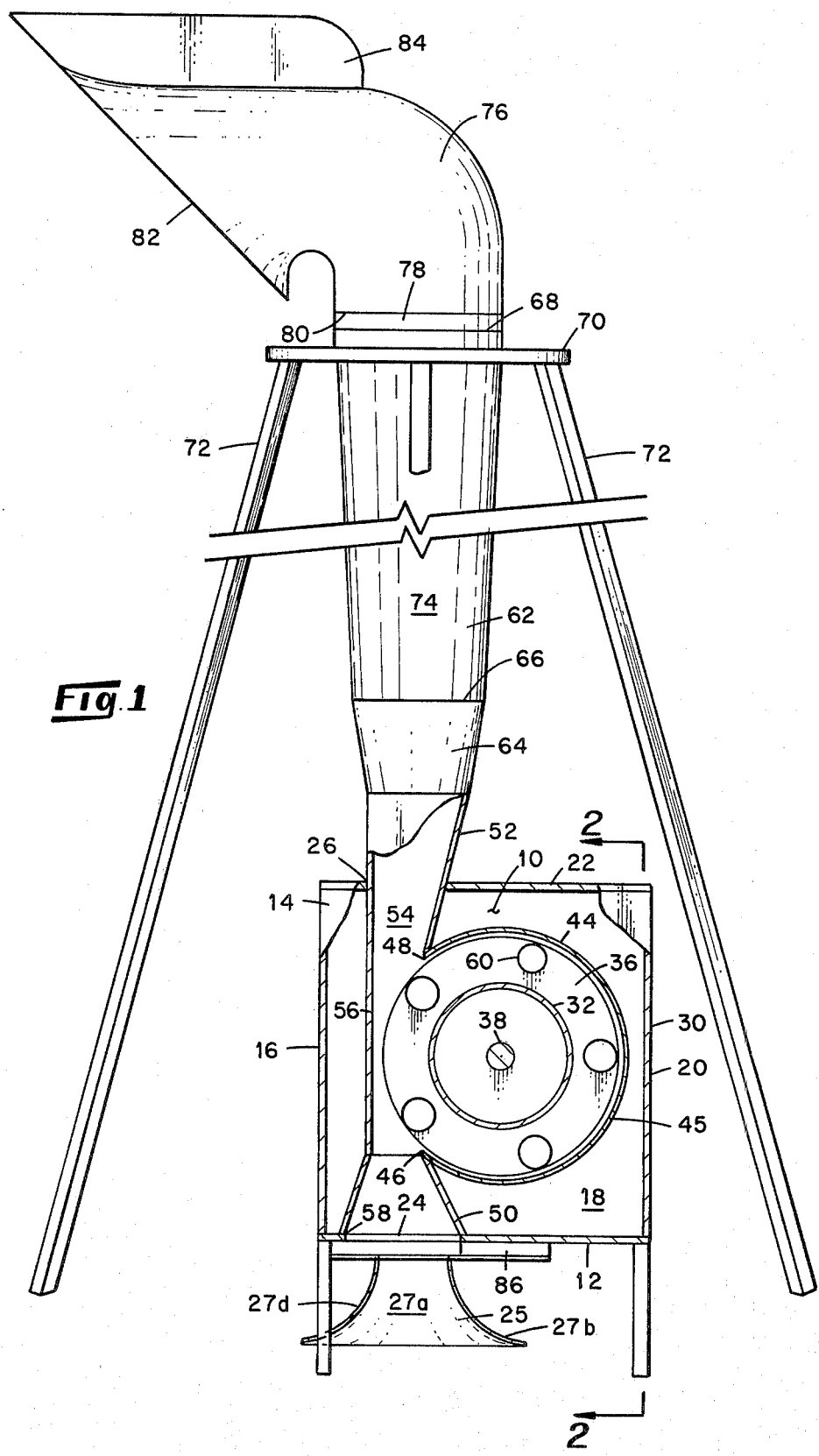
FIG. 1 is a partially fragmented elevational view of a convection energy converter embodying various of the features of the present invention.
Figure 2:
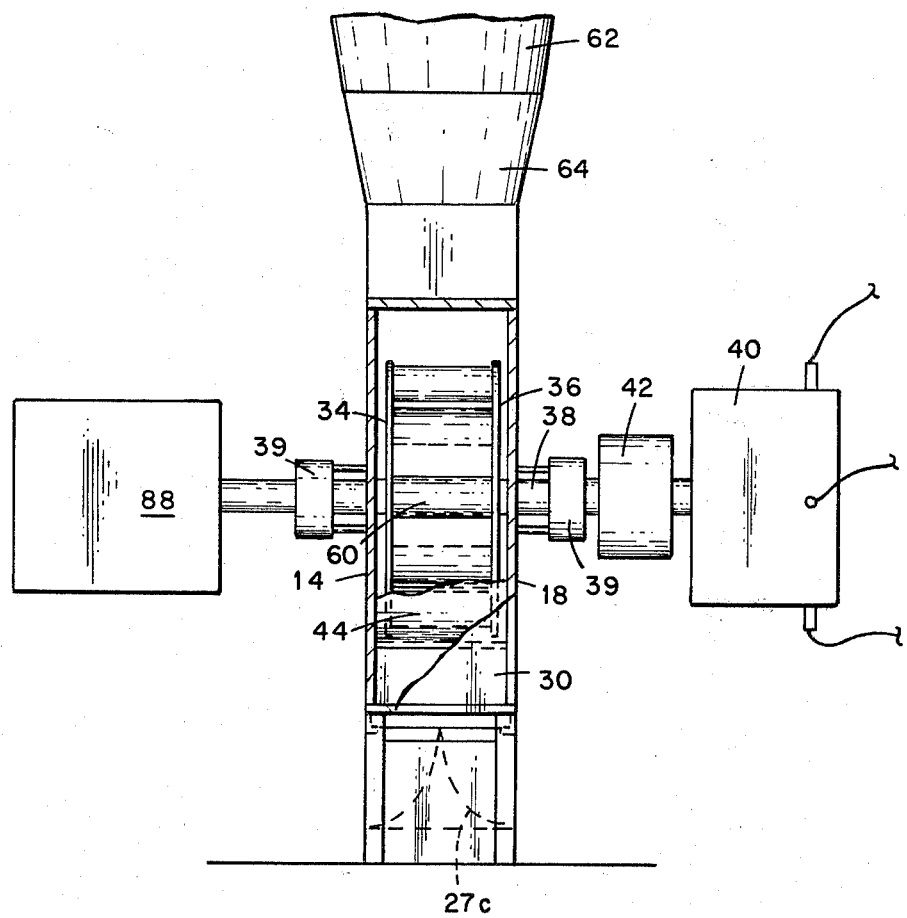
FIG. 2 is a fragmented cross-sectional view taken along line 2—2 of FIG. 1.

Generally, in accordance with the present invention, a generally vertical airflow path is defined within a foil chamber, which is raised above ground level to allow air access to the bottom of the foil chamber. A tube of increasing cross-sectional area extends vertically upwardly from the foil chamber. At the top of the tube, a hollow rotatable 90° elbow is mounted for rotation in accordance with the direction in which the wind blows at any given time. Air is drawn upwardly, from an adjustably-sized opening in the bottom of the foil chamber and through the foil chamber by convectional airflow within the tube. Wind currents adjacent to the elbow are used to increase airflow through the tube.

A wheel carrying a plurality of cylindrical foils is mounted within the foil chamber with a horizontal axis of rotation. As the upwardly moving air passes through the housing, it causes the upward motion of each foil within the airflow path, which motion in turn effects rotation of the wheel to drive a generator and develops electrical energy.

Referring more specifically to the drawings, a foil chamber 10 is defined by a housing comprising a horizontal base wall 12, four vertical side walls 14, 16, 18 and 20 and a horizontal top wall 22. The base wall 12 and top wall 22 each define an aperture 24 and 26, respectively. The apertures 24 and 26 are in vertical register with one another. The chamber 10 is supported in spaced relation above ground level by four corner posts 28. Thus, there is essentially complete airflow access to the aperture 24 from all lateral directions. A baffle member 25 is located immediately below the aperture 24 to aid in directing air into the chamber 10. The baffle includes four curved walls 27a, b, c and d oriented at 90° intervals.

A wheel 30, including a cylindrical hub 32 and two parallel, planar rim members 34 and 36, is mounted for rotation about a horizontal axis within the foil chamber 10. The rim members 34 and 36 are coaxially mounted upon a horizontal axle 38 which extend through the walls 14 and 18. The axle 38 is carried by a pair of bearings 39 and is operatively connected to a generator 40 through a gear box 42, whereby rotation of the rim members 34 and 36 drives the generator 40. The rim members 34 and 36 are weighted to maintain a generally constant rate of rotation.

A cowl member 44 is mounted within the chamber 10 in partially surrounding relation with the wheel 30. The central portion 45 of the cowl member 44 is semi-cylindrical and concentric with the wheel 30 over about 255°, extending from a lower edge 46 to an upper edge 48, between the walls 14 and 18. The upper edge 48 and lower edge 46 cooperatively define a vertical plane. A lower planar extention portion 50 extends angularly from the edge 46 to the wall 12, adjacent to the aperture 24.

An upper planar extension portion 52, coplanar with the portion 50, extends angularly from the edge 48 through the aperture 26. The extension portions 50 and 52 also extend between the side walls 14 and 18.

A plenum 54 is defined within the foil chamber 10 by the cowl 44, portions of the side walls 14 and 18 and a side member 56. The side member 56 includes a lower portion 57 which extends angularly from the edge 58 of the aperture 24 to a level opposite 46, then the member 56 extends vertically through the aperture 26. The side member 56 extends between the side wall 14 and the side wall 18. The extension 50 and lower portion 57 cooperatively define a throat within the plenum 54.

Five cylindrical airfoils 60 are mounted between the circular rim members 34 and 36 at 72° intervals around the hub 32. Each of the foils 60 has a diameter which is one half of the distance between the side member 56 and hub 32. The foils 60 are radially spaced from the hub 32 by a distance equivalent to the radius of a foil to permit airflow therebetween. The foils 60 extend to the outer edges of the rims 34 and 36, which are spaced from the side member 56 by a distance equivalent to the radius of a foil 60 to permit airflow between the foils 60 and plenum side member 56.

The plenum 54, which is rectangular in horizontal cross-section above the wall 22, extends abover the upper wall 22 to join an inverted conical tube 62. A conventional transition member 64 interconnects the rectangular upper portion of the plenum 54 with the circular lower end 66 of the tube 62. The tube 62 extends upwardly from the transition member 64 to terminate at a circular upper end 68. A support frame 70 surrounds the upper end 68 and a plurality of supporting legs 72 extend downwardly and outwardly from the frame 70 to engage the ground and prevent the tube 62 from swaying with the wind.

The cross-sectional area of the tube 62 at the upper end 68 is about 2.5 times the cross-sectional area of the plenum 54 at the aperture 26.

The interior surface of the tube is polished to minimize frictional resistance to airflow through the tube 62. The outer surface 74 of the tube 62 is black to aid in heat absorption from sunlight.

A 90° directing elbow 76 is swivel-mounted upon the tube 62 at the upper end 68 by means of a standard sealed bearing 78. The elbow 76 includes an entry end 80, having a circular cross-section approximately equivalent to the circular cross-section of the upper end 68 of the tube 62, and an exhaust end 82 which is circular and oriented at a 45° angle with respect to the central axis of the 90° elbow 76. The exhaust end 82 is also flared outwardly from the central axis.

A planar wind vane 84 is mounted upon the upper surface of the elbow 76, parallel to the central axis of the elbow. The vane 84 deflects the elbow 76 in accordance with the prevailing wind direction so that the exhaust end 82 is directed downwind at all times.

In operation, the black tube 62 absorbs solar energy striking the tube. The absorbed energy is transmitted to air within the tube 62 in the form of heat energy. The heated air naturally expands and rises within the tube 62, eventually exiting through the exhaust end 82 of the elbow 76. If wind is blowing, the vane 84 causes the exhaust end 82 to be directed downwind. As wind blows past the exhaust end 82, the atmospheric pressure is reduced at that location, thus increasing the airflow through the tube 62. The outward flaring of the elbow 76 at the exhaust end 82 increases the area of the wind resistance to further reduce the atmospheric pressure at the exhaust end 82, and, thus, further increase the airflow through the tube 62.

As air rises within and exits from the tube 62, replacement air is drawn into the plenum 54 of the foil chamber 10 through the aperture 24. The incoming air rises from the aperture 24 to the aperture 26, passing between the rim members 34 and 36 of the rotatable wheel 30. At any given time at least one of the cylindrical foils 60 is located between the apertures 24 and 26, within the airflow path, such that the rising air flows around the exposed air foil 60. The flow of air around the foil 60 lowers the atmospheric pressure along the upper surface of the foil, thus creating lift. The lift is transmitted to the wheel 30 which then rotates to drive the generator 40 through the axle 38.

As the wheel rotates, the cylindrical nature of the foils 60 provides a continuing airfoil effect for as long as each foil 60 is exposed to the upwardly flowing air, despite the rotation of the wheel 30. The foils 60 are angularly spaced around the wheel 30 and the width of the plenum 54 is correspondingly limited so that for the greatest time possible only one foil is exposed to the airflow at a time. Maximum lift benefits are thus achieved for each foil 60 without disrupting the lift effects upon the preceding foil 60. Also, the number of foils 60 is minimized to reduce the frictional resisting effects as the foils pass adjacent to the cowl 44.

A sliding door 86 is mounted upon the outer surface of the base wall 12 adjacent to the aperture 24. As desired, the door 86 can be adjusted to partially block the aperture 24 and thus restrict airflow through the foil chamber plenum 54.

Also, an auxiliary hydraulic power system 88 is drivingly connected to the shaft 38 to provide supplemental rotational energy to the shaft 38 when naturally occurring airflow does not create sufficient energy to meet demands.

Employing the present invention, improved airflow is provided for a convection energy converter. Also, the efficiency of the conversion is improved. Moreover, the apparatus permits the use of wind to develop airflow even when solar energy is not available.

While a preferred embodiment of the present invention has been shown and described hereinabove, it will be recognized that various modifications and improvements may be made without departing from the spirit and scope of the invention as set forth in the following claims.

I claim:

1. An apparatus for converting wind energy into rotational motion comprising:
   a housing having a lower aperture and an upper aperture;
   a wheel mounted for rotation within said housing and having a generally horizontal axis of rotation;
   about five cylindrical foil members mounted on and adjacent to the perimeter of said wheel at equal angular spacing of about 72° for rotation therewith;
   a semi-cylindrical cowl member for partially enclosing said cylindrical foil members and being mounted within said housing in a concentric relationship with said wheel and being dimensioned to be slightly greater in diameter than a circle defined by the outermost points of said cylindrical foil members;
   a cylindrical hub mounted concentrically on said wheel and being spaced radially inwardly of said foil members at a selected distance so that said hub and said cowl define a semi-annular air passageway disposed concentrically about the center of said wheel through which said foil members travel when said wheel rotates, said cylindrical hub isolating the semi-annular air passageway from space within the interior of the hub;
   plenum structure cooperating with said cowl member and said hub to define a plenum extending from said lower aperture to said upper aperture and being disposed so that said cylindrical foil members are disposed within said plenum as said foil members are traveling in a generally upward direction as they rotate on said wheel;
   an elongated tube member extending upwardly and outwardly from said upper aperture to an exhaust end, said tube member and exhaust end being configured so that wind impinging thereon causes air flow upwardly into the lower aperture, through the said plenum, through said upper aperture, through said tube member and out said exhaust end, whereby the rising air in said plenum lifts the cylindrical air foils disposed in the plenum to rotate said wheel and cause semi-circular air flow within said annular air passageway.

2. The apparatus of claim 1 wherein said cylindrical air foils have a diameter of about one half the width of the plenum and wherein said cylindrical air foils are spaced from said hub at a distance of about one quarter and width of the plenum so that said cylindrical air foils pass through the approximate center of said plenum and air flows on either side of said air foils in said plenum.

3. The apparatus of claim 1 wherein said cowl member extends about the center of said wheel for an annular distance of about 255 degrees.

4. The apparatus of claim 1 further comprising weight mounted on said wheel.

5. The apparatus of claim 1 wherein the cross-sectional area of said tube member at its exhaust end is 2.5 times the cross-sectional area of said plenum.

6. The apparatus of claim 1 wherein said exhaust end of said tube member comprises a rotatable elbow member mounted on the upper end of said tube.

7. The apparatus as defined in claim 1 wherein said housing is supported in a spaced relation with the ground to permit air access to said lower aperture from essentially all lateral directions.

* * * * *